(12) United States Patent
Etter et al.

(10) Patent No.: US 8,973,598 B2
(45) Date of Patent: Mar. 10, 2015

(54) PRIMING VALVE DEVICE FOR WATER CIRCUIT OF A BEVERAGE MACHINE

(75) Inventors: Stefan Etter, Kehrsatz (CH); Sandro Zingg, Gasel (CH)

(73) Assignee: Nestec S.A., Vevey (CH)

( * ) Notice: Subject to any disclaimer, the term of this patent is extended or adjusted under 35 U.S.C. 154(b) by 1485 days.

(21) Appl. No.: 12/094,590

(22) PCT Filed: Nov. 27, 2006

(86) PCT No.: PCT/EP2006/068929
§ 371 (c)(1),
(2), (4) Date: May 21, 2008

(87) PCT Pub. No.: WO2007/068572
PCT Pub. Date: Jun. 21, 2007

(65) Prior Publication Data
US 2008/0283131 A1 Nov. 20, 2008

(30) Foreign Application Priority Data

Dec. 16, 2005 (EP) .................................... 05112312

(51) Int. Cl.
*G05D 11/00* (2006.01)
*A47J 31/46* (2006.01)
*F16K 17/04* (2006.01)

(52) U.S. Cl.
CPC ............ *A47J 31/46* (2013.01); *F16K 17/0473* (2013.01)
USPC ............ 137/115.06; 137/115.03; 137/115.08; 137/115.16; 417/299; 99/300

(58) Field of Classification Search
CPC ..... F04C 14/24; F04D 9/005; F04D 15/0011; A47J 31/46

USPC ............ 137/115.03, 115.04, 115.05, 115.06, 137/115.08, 115.09, 115.11, 115.14, 137/118.01, 119.01, 115.15, 115.16; 99/300–315; 417/299
See application file for complete search history.

(56) References Cited

U.S. PATENT DOCUMENTS

| 1,998,223 | A | * | 4/1935 | Czarnecki, Jr. | .......... 137/115.05 |
| 3,035,596 | A | * | 5/1962 | Guinard | .................... 137/115.05 |
| 3,967,637 | A | * | 7/1976 | Jackson | ........................ 137/110 |
| 4,085,767 | A | * | 4/1978 | Gibbs | ............................. 137/102 |
| 4,154,257 | A | * | 5/1979 | Adachi | .......................... 137/101 |

(Continued)

FOREIGN PATENT DOCUMENTS

| EP | 606 042 A1 | 7/1994 |
| EP | 690 234 A2 | 1/1996 |

(Continued)

OTHER PUBLICATIONS

International Search Report PCT/EP2006/068929 Dated Mar. 23, 2007.

*Primary Examiner* — Kevin Murphy
(74) *Attorney, Agent, or Firm* — K&L Gates LLP

(57) ABSTRACT

A priming valve device for a beverage machine. The device includes a casing assembly including a water inlet, a water outlet, and a drain and venting portion for discharging water or air during priming and a valve assembly associated with the casing assembly. The valve assembly includes a valve member which is moveable to a closed position which closes the water outlet by elastic return when the pressure in the water inlet decreases under the elastic return pressure of the valve member.

14 Claims, 5 Drawing Sheets

(56) References Cited

U.S. PATENT DOCUMENTS

| | | | | |
|---|---|---|---|---|
| 4,244,388 A | * | 1/1981 | Feiss | 137/115.16 |
| 4,385,640 A | * | 5/1983 | Iverson | 137/115.05 |
| 4,922,955 A | * | 5/1990 | Uri | 137/496 |
| 4,967,783 A | * | 11/1990 | Loos | 137/115.05 |
| 5,498,757 A | * | 3/1996 | Johnson et al. | 426/520 |
| 5,682,920 A | * | 11/1997 | De'Longhi | 137/341 |
| 5,996,966 A | * | 12/1999 | Zimmerly | 251/357 |
| 6,295,811 B1 | * | 10/2001 | Mangano et al. | 60/468 |
| 6,334,458 B1 | * | 1/2002 | Amaduzzi | 137/115.05 |
| 6,382,929 B1 | | 5/2002 | Di Benedetto | 417/307 |
| 2004/0079411 A1 | * | 4/2004 | Davis | 137/115.16 |
| 2005/0194043 A1 | * | 9/2005 | Okamoto | 137/115.03 |

FOREIGN PATENT DOCUMENTS

| | | |
|---|---|---|
| EP | 690 234 A3 | 1/1996 |
| EP | 690 234 B1 | 1/1996 |
| EP | 1 003 997 B1 | 10/2003 |

\* cited by examiner

PRIMING VALVE DEVICE FOR WATER CIRCUIT OF A BEVERAGE MACHINE

This application is a 371 filing of International Patent Application PCT/EP2006/068929 filed Nov. 27, 2006.

BACKGROUND

The invention relates to a priming valve device that can ensure priming of the pump in a water circuit. The invention further relates to a beverage machine such as a coffee machine comprising such a priming valve device.

In modern coffee machines, beverages can be prepared by passing hot water under a certain pressure through a container or chamber that contains the beverage ingredient. Water is pumped from a water tank by a pressure pump, e.g., a piston pump, that pushes water in a heater for heating, typically a thermobloc, a boiler or an on-demand heater, and injects the hot water through the beverage ingredients. The beverage ingredients are extracted or dissolved under pressure and a beverage extract or mixture is released through the container. The pressure pump may deliver a pressure of more than 5 bar, typically 15 to 20 bar; which pressure depends on the backpressure opposed by the container, the ingredients (e.g., granulometry, bed size, . . . ), a backpressure valve, etc., but also a particular mode of opening of the container and/or by a particular filtering mode of the beverage. Certain containers require a high pressure to be delivered by the pump and the opening for the release of the beverage extract is carried out by tearing of a plastic or aluminium membrane of the container.

Priming problems of the pressure pump occurs typically when the water tank becomes empty, air introduces in the pump and the water tank must be replenished by the user. The pressure differential at the pump becomes too high between the entry, where pressure is at about atmospheric pressure, and the exit of the pump, where the pressure is much higher, and water can no longer be pumped. To resolve this problem, the portion of the water downstream of the pump must be drained which may so require the opening of the beverage chamber and the loss of the container.

Another problem relates to the limestone scaling of the heater. The heater must preferably be maintained under a certain pressure in order to ensure that hot water remains in liquid form. The reduction of pressure leads liquid water to transform into steam which causes serious limestone scaling problems. In particular, heaters such as thermoblocs are very sensitive to scale problems because of the narrow section of tubes in the serpentine heating circuit that becomes clogged more rapidly.

In the prior art, there have been attempts to develop priming valve devices for vibration pumps, in particular, in EP 1 003 997 B1. The device performs the function of self-priming the pump, balancing a negative pressure in a boiler when it cools down and furthermore protecting the boiler against overpressure. The device comprises a non-return or check valve, an air release valve arranged upstream the non return valve to perform the self priming function for the pump and a safety valve for allowing air entrance in the boiler and associated downstream of the check valve and in parallel with the air release valve. Such a device is relatively complicated and may lead to leakage issues because it requires several separate valves to be operated in a coordinated manner; each valve acting upon separate resilient means of different compressive strength. In particular, the device tends to leak when it is used to prime a piston pump. The device is unstable (i.e., it operates very small repeated openings/closings corresponding to the vibration of the pump) because of the water flow fluctuation that occurs at the frequency of the pump. Another problem of this prior art is due to the fact the check valve can only open under the dynamic pressure created by the pump and thus a backpressure of several bars is created by the check valve. As a result, the extraction of the beverage ingredients is performed at lower pressure than the optimum pressure range in absence of the backpressure valve. It is therefore necessary to propose a solution for priming a pressure pump in a water circuit of a beverage machine which is of a simpler and more efficient functioning, i.e., that should reduce leakage problems and the significant pressure loss of the prior art devices.

SUMMARY OF THE INVENTION

The present invention now meets these needs.

For this, the priming valve device of the invention comprises a casing assembly including a water inlet connectable to the pump side, a water outlet connectable to the heater side and a drain and venting portion for draining water and/or venting air outside during priming. The device comprises a valve assembly associated with the casing assembly which comprises a valve member configured for selectively moving to a closed position of the drain and venting portion when the water inlet reaches a certain pressure of water by effect of the pressure pump during extraction or brewing. In one aspect of the invention, the same valve member is moveable to a closed position of the water outlet, by elastic return, when the pressure in the water inlet decreases under the elastic return pressure of the valve member.

The pressure in the water inlet decreases sufficiently, for instance, when the water pump is shut off after extraction or brewing. The valve member is so forced to return to a closed position of the outlet since the pressure exterted by the elastic means exceeds the pressure of water in the water inlet when the pump is stopped.

It should be noted that the elastic means can be an integral part of the structure of the valve member itself or be a separate piece such as a spring.

Therefore, one aspect of the invention lies in having a same valve member for selectively blocking either the drain/vent path or the normal water path in the water circuit. Contrary to the prior art device, the present device is of a much simpler and more reliable conception and it avoids leakage problems. Furthermore, as opposed to the use of several valve members, the same valve member moves in one block from the two positions therefore it prevents problems of valve members not moving in a coordinated way because of various factors such as accumulation of scale or fatigue of the pieces.

In one aspect of the invention, the valve member is moveable to a closed position of the water outlet along a substantially transversal direction relative to the longitudinal axis of the water outlet. In such an arrangement, a static pressure of the fluid is sufficient to maintain the valve open as opposed to the longitudinal arrangement of the prior art wherein only a dynamic pressure is required to open the valve. Also, the force or pressure of the elastic return for closing the water outlet can be relatively low while still being effective for a proper closure of the water outlet. As a result, the loss of pressure in the device is minimized. Therefore, a higher pressure is available for the brewing or extraction of the beverage.

In one aspect of the invention, the valve member can be made less sensitive to the flow rate fluctuation as caused by the sinusoidal frequency mode of the pump. For this, the valve member can have at least one flexible portion. In particular, the valve member may comprise a membrane portion.

According to another aspect of the invention, in order to close the water outlet in a water-tight manner, the valve member comprises a first end portion with first sealing surfaces configured to match in a water-tight arrangement a seal support surface at the water inlet. The valve member preferably also comprises a seal portion that separates in water-tight manner the water outlet and the drain and venting portion. Therefore, again the valve member offers the two functions at once of, firstly, selectively sealing the water inlet when no or low pressure is applied, and secondly sealingly separating the water outlet and the drain/vent flow path.

In still another aspect of the invention, in order to drain or vent the water inlet, the valve assembly furthermore comprises at least one vent/drain restriction or small gap between the water inlet and the drain and venting portion.

The vent/drain restriction or gap can be placed before the valve member or in the valve member itself.

In a preferred mode, the restriction or gap is placed at the entry of a communication passage(s) provided across the valve member for venting air through the valve member. The water restriction can also be the entire passage itself. The restriction or gap may take various shapes, sizes and numbers. However, the water restriction or gap should be sufficiently small so that pressure loss generated by the drain/vent restriction or gap with only air or, water/air at low pressure present in the water inlet, is too small to move the valve member for closing off the vent and drain portion. Conversely, the pressure loss generated by the restriction or gap, when water is under pressure in the water inlet during pumping, becomes high enough to move the valve member to the closed position of the vent and drain portion and consequently to open the water outlet. In other words, the difference of viscosity between water and air enables either to close or to maintain the valve open.

As a result, the pump is primed by the balancing of pressure downstream of the pump and by eventually removing air having been pumped if the pump has been run with an empty water reservoir. Air is so removed through the valve assembly to the vent and drain portion.

The dimensions of the restriction or gap is function of the force of the resilient means (e.g., spring) of the valve assembly. For instance, the surface of the vent/drain restriction or gap can be of between 0.1 mm$^2$ and 2 mm$^2$, more preferably between 0.25 and 1 mm$^2$.

Furthermore, according to still another aspect, in order to block the water/air communication passage, in the closed position of the drain and venting portion, the valve member further comprises a second end portion with second sealing surfaces configured to match in a water-tight arrangement a seal support surface of the drain and venting portion. The second end portion is typically at the opposite side of the valve member. Therefore, depending on the relative end positioning of the valve member in the casing assembly, one or the other sealing surface creates a tight arrangement for the intended positions.

In certain circumstances, i.e., for rinsing or descaling purpose, the valve member may be positioned in an intermediate position in which the sealing surfaces are not in tight engagement with the casing assembly therefore enabling solids and dirts to be dislodged from the surface of the device and be flushed more effectively through both the water outlet and the drain/vent portion. For this the pressure in the water inlet may decrease at a value at which the valve member is partly returned by the elastic means but not to a fully closed position. The partial return pressure of the resilient means is so determined to be equivalent to the one exerted by the pump during rinsing. The pump pressure during rinsing thus results from a lower backpressure generated in the water circuit when there is no beverage ingredient to be extracted or brewed to increase pressure sufficiently.

The second sealing surface of the valve member may have preferably an annular shape, for example at least one truncated, conical or rounded surface that preferably fits an annular recessed, flat or slanted surface of the drain/vent portion.

The valve member may be guided, for moving from one position to the other, along at least one guiding means of the casing assembly located on each side of the valve member. Each guiding means may take various forms such as the form of a pin or other equivalents means.

Furthermore, the valve assembly further comprises at each end portion of the valve member a guiding bush that fits into a housing of the valve member; each bush being complementary guided by one of the guiding means, e.g., guiding pin. The guiding bush may be made of a more durable and harder material than the material of the valve member. A relatively hard material promotes the precision of the gap that is maintained for the water/air draining between the bush and the pin at the water inlet side. The material can also wear less than the material of the valve member thus being capable of repeated reciprocating motions.

For instance, the bushing can be made of metal or durable (wear resistant) plastic.

As opposed, the valve member can be made of an elastomeric material. The elastomeric material can be chosen for its ability to repeatedly compress at its sealing surfaces and to withstand the frequent variations of the water pressure conditions without cracking or cutting and to extend the lifetime of the device.

BRIEF DESCRIPTION OF THE DRAWINGS

Further advantages, features and objects of the present invention will become evident when reading the following detailed explanation of the preferred embodiment taking in conjunction with the figures attached.

DETAILED DESCRIPTION OF THE PREFERRED EMBODIMENTS

Figure 1:
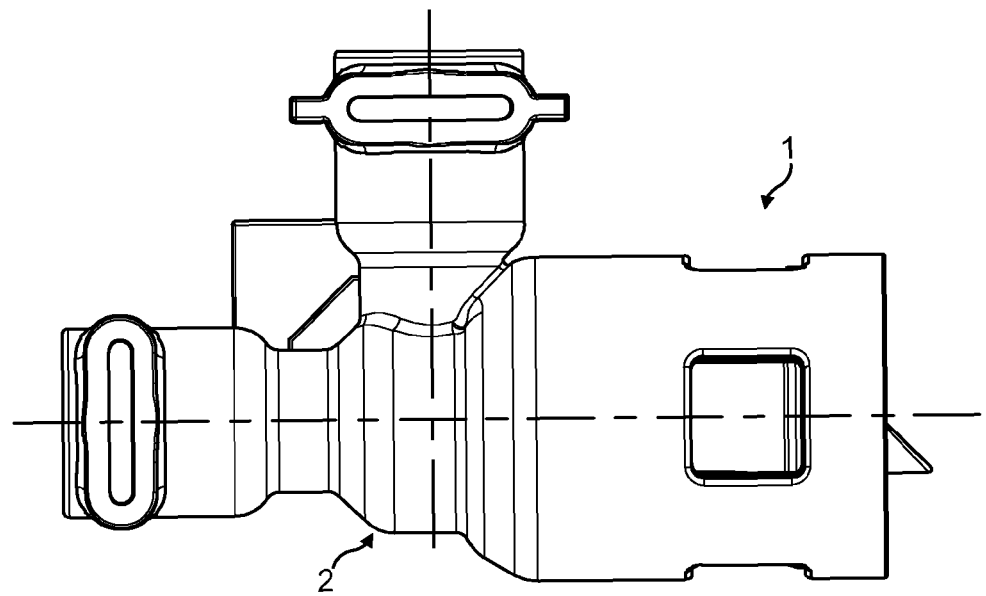
FIG. 1 shows a general planar view of the valve device of the invention.
Figure 2:
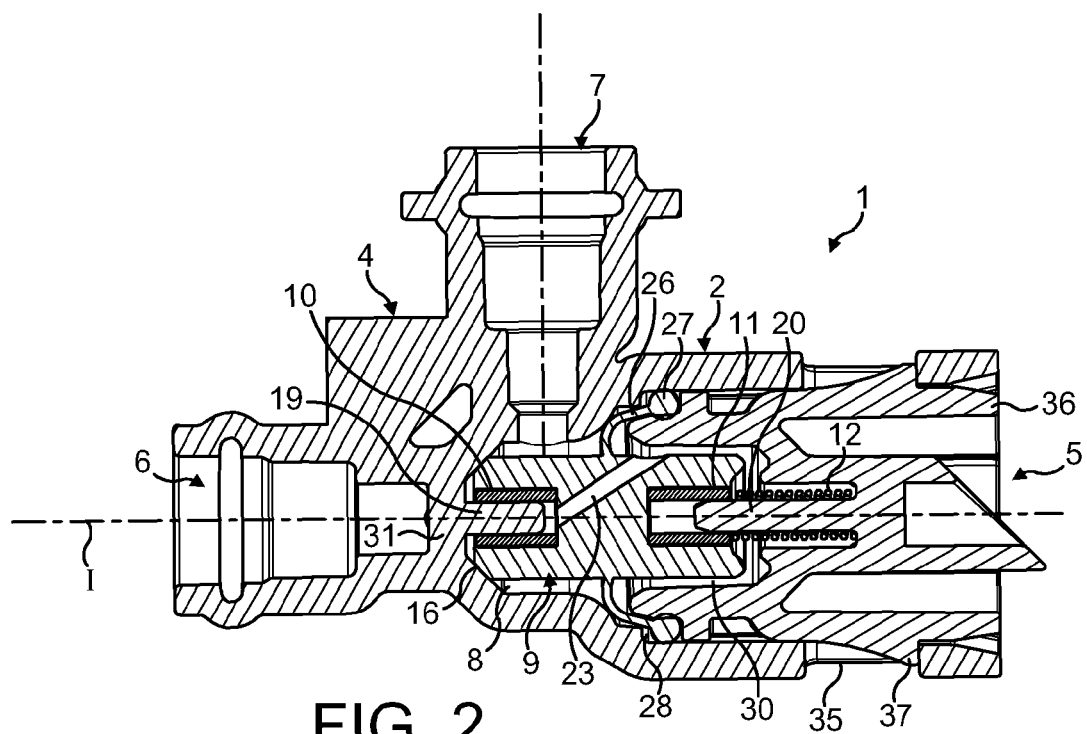
FIG. 2 is a cross-sectional the view of FIG. 1 taken along a longitudinal median vertical plane.
Figure 3:
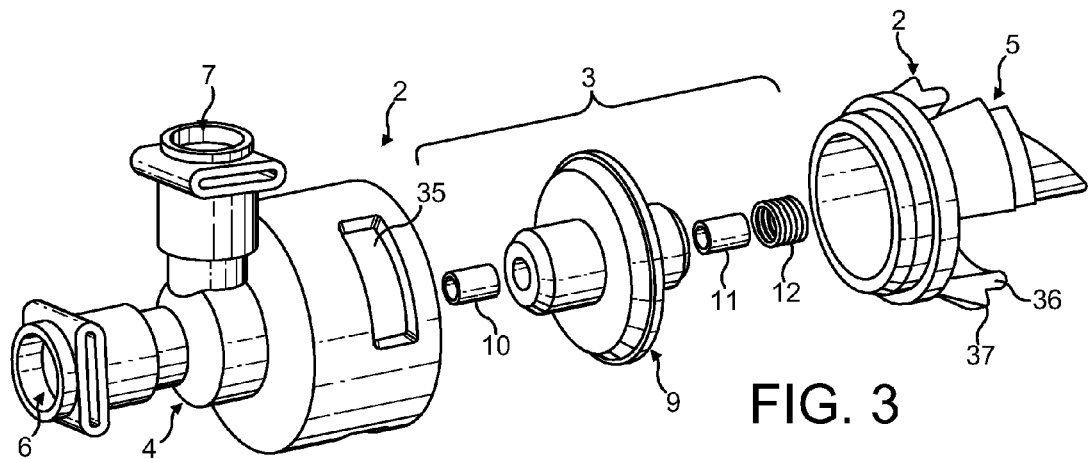
FIG. 3 shows an exploded view of elements making up the valve device of the invention.

In FIGS. 1 to 3, a priming valve device 1 is shown according to a preferred embodiment. The priming valve comprises a casing assembly 2 consisting of two component parts connected together to house internally a valve assembly 3. The priming device 1 is of a simple construction since only a limited number of pieces is necessary to fulfil the intended pump's priming, pressure control of the water circuit, and cleaning/rinsing functions.

Figure 7:
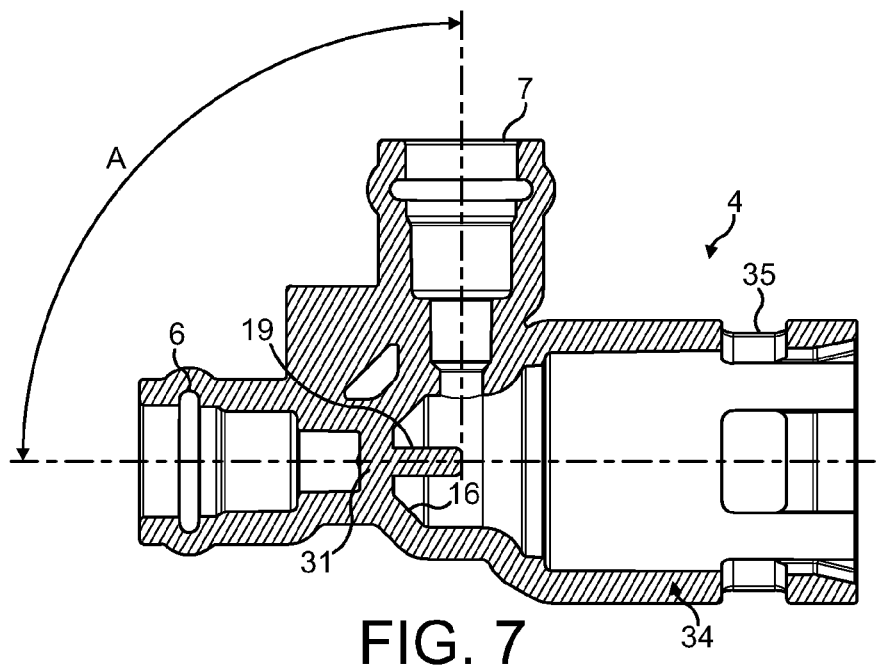
FIG. 7 shows a cross-sectional view of the first casing component or "main case" along a longitudinal median vertical plane.
Figures 8, 9:
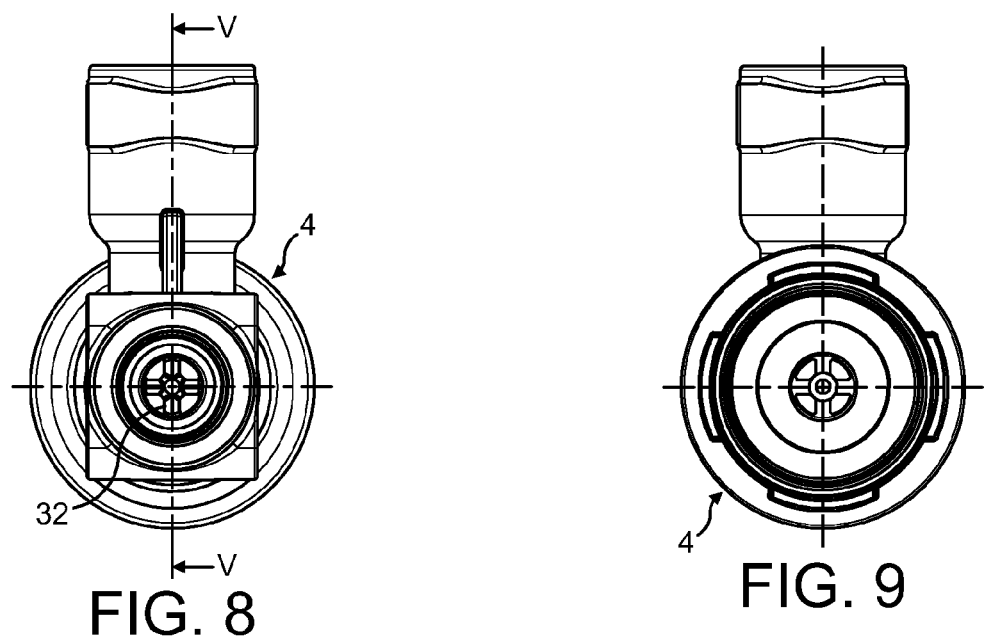
FIG. 8 is a left side view of the casing component.
FIG. 9 is a right side view of the casing component.
Figure 10:
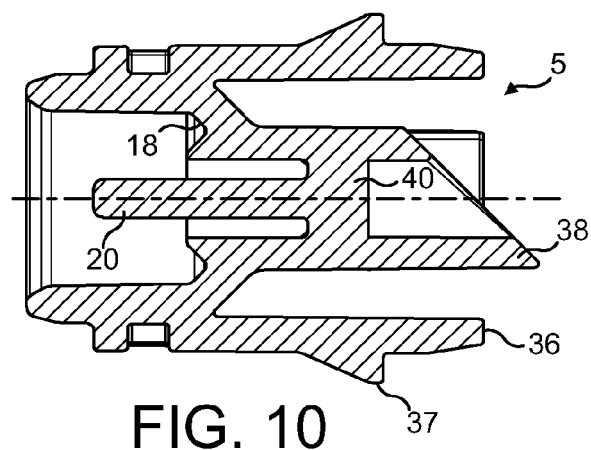
FIG. 10 shows a cross-sectional view of the second casing component or "priming rinse connector"
Figure 11:
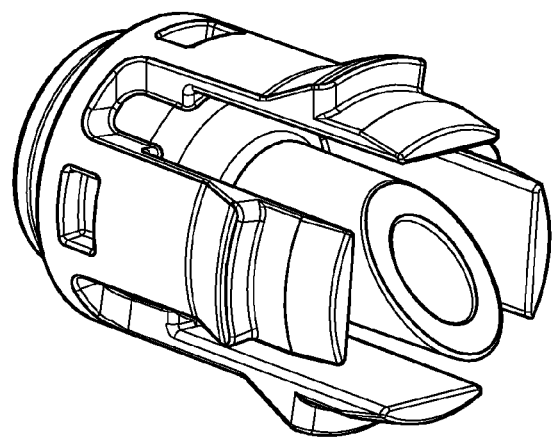
FIG. 11 is a perspective view of the second casing component.
Figure 12:
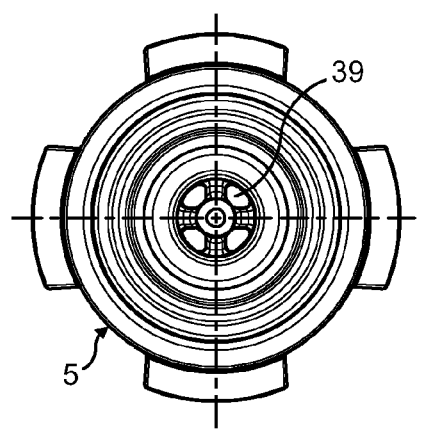
FIG. 12 is a right or internal view of the second casing component.

The casing assembly 2 comprises a first component part or main case 4 which is illustrated in full detail in FIGS. 7 to 9 and a second component part or low-pressure connector 5, which forms the drain and venting portion of the device, is illustrated in full detail in FIGS. 10 to 12.

The main case 4 has a water inlet 6 consisting of a short portion of duct with connection means adapted to connect the inlet to the tubings of a water circuit at the downstream side of an alternative pressure pump. An alternative pressure pump is typically a piston pump that can deliver elevated pressure within a range of from about 5 to 20 bar. The main case 4 also has a water outlet 7 forming a short portion of duct connectable to tubings of the downstream water circuit for the water to exit the device when pressurized by the pump. Normally, the outlet is connected to a tube that connects to the heater of the water circuit. The heater can be a thermobloc, a boiler or an on-demand heater, e.g., a cartridge heater or thick film tubular heater.

The water inlet 6 and water outlet 7 both communicate with a valve chamber 8 of the casing assembly. The inlet and outlet are preferably oriented relatively one another by an angle A of less than 180 degrees, preferably comprised between 10 and 175 degrees, most preferably between 90 and 120 degrees (FIG. 7). This angular positioning of the water outlet with respect to the water inlet participates to the inventive conception of the device with a same valve assembly being able to performs the selective opening/closing of the water circuit and draining/venting as it will later be explained.

Figure 5:
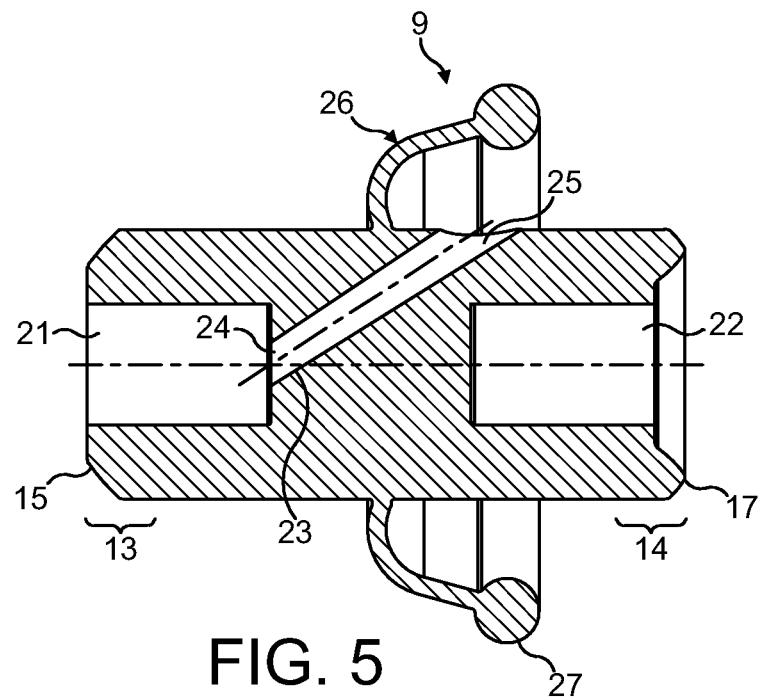
FIG. 5 shows a cross-sectional view of the valve member.
Figure 6:
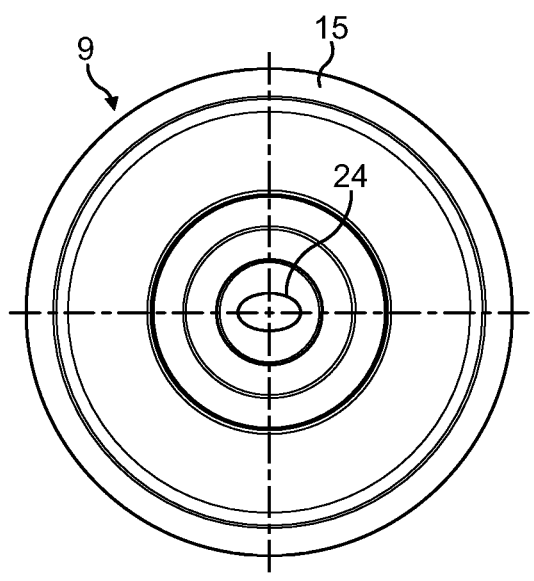
FIG. 6 shows a left side view of the valve member.

As illustrated by FIG. 3, the valve assembly 3 is housed inside the valve chamber 8. The valve assembly is formed of a valve member 9, two guiding bushes 10, 11 and an elastic return means 12. The valve member 9 is illustrated in detail in FIGS. 5 and 6. The valve member comprises a first end portion 13 and a second end portion 14 opposite to the first end portion. The first end portion has a substantially circular cross section and tubular shape, larger than the cross section of the inlet merging in the valve chamber, and comprises an annular first sealing surface 15. The surface 15 is slanted outwards to engage, in sealing engagement during closing of the water inlet, a flared surface 16 of the valve chamber located at the periphery of the exit of the water inlet 6. As it can be seen in FIG. 2, the sealing engagement of surfaces 15, 16 when the valve member is compressed toward the inlet enables to isolate water inlet 6 from water outlet 7.

Onto its second portion 14, is provided a second sealing surface 17, for instance, forming a tapered surface like a trunconical annular surface that is configured to engage a seal support surface 18 of substantially complementary shape of the low pressure connector 5. The low-pressure connector 5 is visible in detail in FIGS. 10 to 12. The connector terminates inwardly by a slightly rounded tubular surface 18 that matches the second sealing surface 17 of the valve member.

The valve member is guided for reciprocating in the valve chamber 8 by two pins, respectively an inlet pin 19 and a drain pin 20 at each opposite side of the chamber. The pins are longitudinally aligned along the main longitudinal axis I of the chamber and protrude inside the chamber 8. The valve member is formed with two opposite cavities 21, 22 that are sized to receive respectively the guiding bushes 10, 11. The bushes are preferably formed of a wear resistant material such as non-corrodible metal, e.g. stainless steel or aluminium, or hard plastic with low friction rate (e.g. PTFE). The bushes favour the sliding or reciprocating movement of the valve member along the pins with reduced friction and wearing for allowing an intensive use of the device.

In order for the inlet to drain or vent toward the drain and venting portion, the valve member is traversed by a water communication passage 23. The passage is a sort of conduit that has its inlet 24 inside the first cavity 21 of the valve member and exits at an outlet 25 on the side of the member.

The valve member also comprises a membrane portion 26 forming a flange-like seal portion that terminates by a seal-engaging end 27 which is tightened by the assembling of the two component parts 4, 5 of the device in an annular seal sub-chamber 28. The flange-like seal portion has the function to ensure a water-tight arrangement between the water outlet 7 of the device and the drain/venting portion 5. Therefore, the outlet 25 of the communication passage of the valve member opens in an interstitial annular cavity 30 of the valve chamber which communicates with the drain/venting portion but is isolated from the water outlet 7 of the device. As a result, when the valve member is in closed position of the outlet, the water pressure can be maintained on the outlet side thanks to both the first sealing surfaces 15 of the first end portion and the membrane portion 26 of the valve member; whereas water can drain and air can vent through the communicating passage to/from the drain/venting portion 5.

Back to the inlet side, one can note from FIG. 7, that the inlet has a wall 31 that is oriented transversally to the direction of the water and that includes small orifices 32 to let water enters the valve chamber. When the valve member is in a closed position toward the water inlet, water can enter the valve member by a small interstice or gap provided between the bush 10 and the inlet pin 19. Of course, the gap could be formed of hole(s) and/or channel(s) and the like, provided in the bush, pin and/or valve member itself.

On the side of the drain and venting portion 5, the valve member is urged by the resilient means 12 that can be a toroidal spring placed around the drain pin 20. The resilient means exerts a constant compressive action against the valve member directly or indirectly on the guiding bush 11 to force the valve member to close against the water inlet 6 when the pressure in the water inlet drops below a threshold value, e.g., corresponding to pressure when the pump stops. The force of the resilient means is calculated so that an effective seal force is exerted by the valve member against the inlet when the pressure upstream the device decreases sufficiently. However, it is important to note that even a relatively small return force is sufficient to move the valve member which thus enables to greatly minimize the loss of pressure in the device. As a result, less pressure loss in the device enables to make available more pressure from the pump for the brewing or extraction of the beverage ingredients. This also offers the opportunity to use smaller pressure pumps, therefore, less expensive.

As shown by FIGS. 2, 7 and 10, the main case 4 and the connector 5 connect together by a snap fitting arrangement. For this, the main case 4 has a generally cylindrical base 34 which is provided with a series of ports 35, at least two, preferably four ports, which are circumferentially distributed through the base's wall. The connector 5 has a generally cylindrical shape with a series of flexure tongues 36 that can deflect toward the centre line of the connector when the connector is introduced in the cylindrical base of the main case. Each tongue extends at its periphery by an abutting portion 37 that is configured to engage inside its corresponding port 35 so that the connector is secured in place in the base. It can be noted that the connector also extends externally along its centre line by a tubular portion 38 of smaller diameter that can serve to connect a flexible portion of tube (not shown). As a result, water that is drained from the device can be returned to the water tank or alternatively discarded in a reservoir for waste water. The drain tube portion 38 has small orifices 39 provided in a transversal wall 40 that supports the pin 20.

The priming valve device functions in the following manner.

By reference to FIG. 1, the priming valve device is intended to be connected to a water circuit of a beverage device such as a coffee machine of the espresso type or multi-beverage type which would normally include a pressure pump that does not prime itself well. Priming issues are typically met with a piston pump that reciprocates alternatively at a frequency of about 50/60 Hertz. Typically, such a pump does not prime when the pump is full of air and this air cannot escape the water circuit. The water inlet 6 is so connected to the pump downstream's side, whereas the water outlet 7 is connected to the heater upstream's side.

When the pump is not running, the priming device is at rest as illustrated in FIG. 1. The valve member is forced against the inlet seal surface 16 by the spring 12. Therefore, the water pressure at the inlet side of the device is low and pressure can equalize between the water inlet and the drain/vent portion through the valve member, in particular via the communication passage 23. The low pressure in the inlet maintains a small differential of pressure at the pump that promotes self-priming. At the same time, the valve member seals the water outlet therefore ensuring that the heater can be maintained under sufficient water pressure to prevent water to transform into steam when the heater is still hot.

Figure 4:
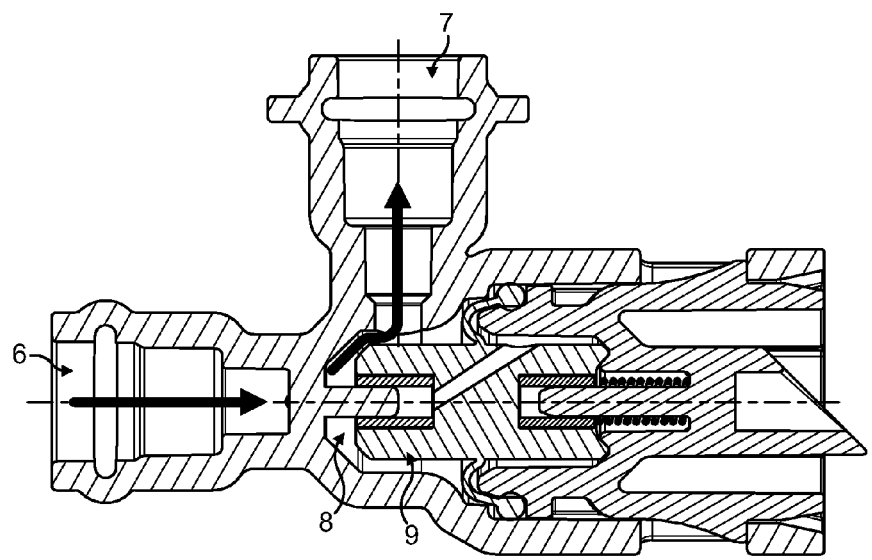
FIG. 4 is a cross-sectional view similar to the view of FIG. 2 but in an open position of the water outlet during extraction or brewing.

When a beverage is prepared, the beverage machine is usually loaded with a portion of beverage ingredient, e.g., a capsule containing roast and ground coffee, and the pump is switched on. The valve member is so pushed backwards by the pressure exerted by the water which so compresses the spring. Since the pressing surface of the valve member far exceeds the surface of the cross section of the vent/drain interstitial gap of the valve assembly, the valve member is rapidly forced to open and the water outlet 7 is opened as shown in FIG. 4. This mode is the normal extraction or brewing mode of the beverage machine.

If water stops feeding the pump, for instance, because the water tank empties, air will occupy the pump. The machine can be stopped and the water tank be replenished. The priming device will so take the position of FIG. 1 again. As the valve member closes on the inlet side, the pressure of water will drop at the water inlet side. When the pump is re-started, the air due to a low viscosity will evacuate easily through the valve member and be vented out through the drain tube portion 38. Pressure will build sufficiently in the water inlet to then force the valve member to open the water outlet in the normal extraction/brewing mode.

In a possible configuration, the valve member 9 is positionable in an intermediate rinsing position wherein its sealing surfaces 15, 17 are respectively disengaged of the seal support surfaces 16, 18 of the casing assembly 2. The valve assembly can thus partially open by the effect of the water pressure that builds in the water inlet. Such pressure being lower than the normal pressure of extraction when the beverage device is loaded with beverage ingredient; this reduced "rinsing pressure" suffices to open the valve assembly but is not enough to compress the resilient means, i.e., spring 12 up to the point where sealing is carried out at the drain/vent portion. As a result, dirts or scale particles can be evacuated both through the vent drain portion, i.e., via passage 23 and water outlet 7.

The device of the invention may also be integrated as a removable or non-removable part of the water pump or as a part of a water heater. Therefore, the invention also concerns a water pump or a water heater comprising the device of the invention.

What is claimed is:

1. A beverage machine that includes a pump and a heater and comprises a priming valve device comprising:

a casing assembly comprising a water inlet in fluid connection with the pump, a water outlet in fluid connection with the heater, and a drain and a venting portion for draining water or venting air during priming, the drain and venting portion positioned at an opposite end of the casing assembly from the water inlet, and the water outlet positioned between the water inlet and the drain and venting portion, and a valve assembly associated with the casing assembly and comprising a valve member configured for selectively moving to a closed position of the drain and venting portion when the water inlet reaches a certain pressure of water during extraction or brewing, and to a closed position of the water outlet by elastic return when the certain water inlet pressure decreases, wherein the valve member is moveable to the closed position of the water outlet along a substantially transverse direction relative to the longitudinal axis of the water outlet.

2. The machine of claim 1, wherein the valve member comprises a membrane comprising at least one portion that is flexible.

3. The machine of claim 2, wherein the membrane separates in a water-tight manner the water outlet from the drain and venting portion.

4. The machine of claim 1, wherein, in order to close the water outlet in a water tight manner, the valve member comprises a first end portion having first sealing surfaces configured to match in a water-tight arrangement a seal support surface at the water inlet.

5. The machine of claim 4, wherein the valve assembly further comprises at least one small restriction or gap between the inlet portion and the drain and venting portion.

6. The machine of claim 5, wherein the valve member further comprises a second end portion having second sealing surfaces configured to match in a water-tight arrangement a seal support surface of the drain and venting portion.

7. The machine of claim 6, wherein the valve member is positionable in an intermediate rinsing position wherein its sealing surfaces are respectively disengaged of the seal support surfaces of the casing assembly.

8. The machine of claim 1, wherein the valve assembly comprises a resilient means associated to the valve member to urge return of the valve member to the closed position of the outlet portion when the pressure in the water inlet decreases.

9. The machine of claim 8, wherein the resilient means is a separate spring or a resilient integral part of the valve member itself.

10. A beverage machine that includes a pump and a heater and comprises a priming valve device comprising:

a casing assembly comprising a water inlet connectable to the pump side of the beverage machine, a water outlet connectable to the heater side of the beverage machine, and a drain and venting portion for draining water or venting air outside during priming, and a valve assembly associated with the casing assembly which comprises a valve member configured for selectively moving to a closed position of the drain and venting portion when the water inlet reaches a certain pressure of water by effect of the pump during extraction or brewing, wherein the same valve member is moveable to a closed position of the water outlet, by elastic return, when the pressure in the water inlet decreases under the elastic return pressure of the valve member, wherein the valve member comprises a flexible membrane portion that separates in a water-tight manner the water outlet from the drain and venting portion, the valve member comprises a passage comprising an inlet and an outlet between which the flexible membrane portion is positioned, and the casing assembly comprises two component parts that connect together to engage the membrane portion in a water-tight manner, and the drain and venting portion comprises a channel to the exterior of the casing assembly, and the water inlet and the channel of the drain and venting portion lie on a longitudinal axis on which the valve member is configured to move, the longitudinal axis substantially transverse relative to the water outlet, and the passage through the valve member is angled relative to the longitudinal axis such that the outlet of the passage is positioned away from the longitudinal axis.

11. The machine of claim 10 wherein the two component parts of the casing snap together around the membrane.

12. The machine of claim 10, wherein the membrane portion extends by a seal engaging end.

13. The machine of claim 10 wherein the two component parts of the casing screw together to engage the membrane in a water tight manner.

14. The machine of claim 10 wherein the valve member is made of an elastomeric or silicone material.

* * * * *